United States Patent
Scherl et al.

(10) Patent No.: US 8,422,737 B2
(45) Date of Patent: Apr. 16, 2013

(54) DEVICE AND METHOD FOR MEASURING A PARKING SPACE

(75) Inventors: Michael Scherl, Bietigheim (DE); Uwe Zimmermann, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 12/735,341

(22) PCT Filed: Nov. 11, 2008

(86) PCT No.: PCT/EP2008/065275
§ 371 (c)(1),
(2), (4) Date: Sep. 28, 2010

(87) PCT Pub. No.: WO2009/089938
PCT Pub. Date: Jul. 23, 2009

(65) Prior Publication Data
US 2011/0013201 A1    Jan. 20, 2011

(30) Foreign Application Priority Data
Jan. 16, 2008  (DE) .......................... 10 2008 004 632

(51) Int. Cl.
*G06K 9/00* (2006.01)

(52) U.S. Cl.
USPC ............................. 382/103; 348/135; 701/300

(58) Field of Classification Search .................. 382/100, 382/103, 104, 106, 181, 190, 195, 203, 206; 348/135, 143, 169–172; 701/300, 301, 302, 701/439
See application file for complete search history.

(56) References Cited

U.S. PATENT DOCUMENTS

| | | | | |
|---|---|---|---|---|
| 6,285,297 | B1 * | 9/2001 | Ball | 340/932.2 |
| 7,053,795 | B2 * | 5/2006 | Maemura et al. | 340/932.2 |
| 7,366,595 | B1 * | 4/2008 | Shimizu et al. | 701/301 |
| 7,706,944 | B2 * | 4/2010 | Tanaka et al. | 701/41 |
| 7,894,631 | B2 * | 2/2011 | Kakinami | 382/103 |
| 2001/0017591 | A1 * | 8/2001 | Kuriya et al. | 340/932.2 |
| 2004/0257244 | A1 * | 12/2004 | Kubota et al. | 340/932.2 |

FOREIGN PATENT DOCUMENTS

| | | |
|---|---|---|
| DE | 198 21 974 | 11/1999 |
| DE | 101 14 932 | 10/2002 |
| EP | 0 735 383 | 10/1996 |
| EP | 1 296 412 | 3/2003 |
| EP | 1 467 225 | 10/2004 |
| EP | 1 628 141 | 2/2006 |
| WO | WO 03/030521 | 4/2003 |
| WO | WO 2005/121834 | 12/2005 |

* cited by examiner

*Primary Examiner* — Anand Bhatnagar
(74) *Attorney, Agent, or Firm* — Kenyon & Kenyon LLP (57) ABSTRACT

A device for measuring a parking space as a vehicle drives past the parking space includes a depth-measuring line scan camera movable together with the vehicle for acquiring individual images of the environment surrounding the vehicle transverse to a longitudinal direction of the vehicle, an arrangement for acquiring the movement of the vehicle, and an evaluation device. The individual images of the environment surrounding the vehicle contain depth information that is resolvable in a vertical direction.

9 Claims, 6 Drawing Sheets

DEVICE AND METHOD FOR MEASURING A PARKING SPACE

BACKGROUND OF THE INVENTION

1. Field of the Invention

The present invention relates to a device and a method for measuring a parking space using a sensor.

2. Description of Related Art

From published European patent document EP 0 735 383 A1, a device is known for recording the environment surrounding a vehicle using a distance sensor. Here, the sensitivity range of the sensor is greater in the vertical direction than in the horizontal direction. A spatially resolved acquisition of the detected objects does not take place.

From published European patent document EP 1 467 225 A1, it is known to record three-dimensional images of the environment surrounding a vehicle using an optical three-dimensional system, for example a 3-D camera.

In addition, from published German patent document DE 101 14 932 A1 it is known to use a scanning distance sensor to scan the region lateral to a vehicle in the surfaces perpendicular to the direction of travel and perpendicular to the surface of the street, and to use the depth profiles thereby obtained to generate a three-dimensional image of the environment surrounding the vehicle.

BRIEF SUMMARY OF THE INVENTION

The device according to the present invention and the method according to the present invention have the advantage that for the acquisition of the 3-D information required for the recognition and measuring of a parking space, a low-cost one-dimensional sensor, namely a depth-measuring line scan camera, is provided. From a multiplicity of successive photographs of the depth-resolving one-dimensional sensor, obtained during movement of the vehicle, a three-dimensional image of the environment surrounding the vehicle can be assembled.

Line scan cameras having a high pixel number are available, so that a particularly high resolution can be achieved. Due to the fact that the data acquired by the line scan camera already contain spatially resolved items of depth information, a precise spatial measurement of the objects in the environment of the vehicle is possible. Thus, in particular the size, shape, and position of a parking space can be determined with a particularly high degree of precision, as can shapes and dimensions of the boundaries of a parking space or obstacles that may be present in the parking space. In this way, a reliable classification and assessment of the relevance of the objects concerned is possible, such as a precise determination of the height of the curb or a reliable distinction between objects that can be driven over and those that cannot be driven over, as well as between objects that cannot be driven over but over which a part of the vehicle body may extend, such as for example a low curb, and objects for which this is not possible. Moreover, with the use of depth-measuring line sensors optical limitations such as the casting of shadows under unfavorable conditions of sunlight, or low contrast between the foreground and the background, do not play a role. The brightness information acquired by the line scan camera at the same time as the depth information can likewise be available for a subsequent evaluation.

The line scan camera is situated on a vehicle with a horizontal direction of view, i.e., for the acquisition of the environment relevant for the recognition and measuring of parking spaces. In particular, parked vehicles and objects situated close to the street surface are to be reliably detected. The direction of view of the line scan camera is preferably perpendicular to the longitudinal direction of the vehicle, but can also be oriented obliquely forward or backward. The one-dimensional image of the environment recorded by the line scan camera is made up of pixels that are preferably configured in the vertical direction; however, the camera scan line can also be oriented obliquely to the vertical.

In addition to the depth information, the intensity or brightness information obtained using the line scan camera can also be evaluated. By increasing redundancy, this information can permit for example inferences concerning the usability of the depth information, for example given a weak signal or errors in the line scan camera. Reflexes can also for example be recognized that also permit inferences concerning the shape of the detected objects. In addition, through evaluation of the reflectance or gray value data the reliability and precision of the object classification can be improved.

In order to evaluate the data supplied by the line scan camera and the movement of the vehicle, at least one evaluation device is provided that can be separate from the line scan camera or can also be integrated into the camera. The evaluation device can also be configured as a part of a higher-order system. The evaluation device can have allocated to it storage devices that can contain data concerning the vehicle, such as the dimensions, the position of the wheels at the corners of the vehicle, or the maximum height of objects that can be driven over or over which parts of the vehicle may pass. The storage devices can also be used to store images from the line scan camera. The evaluated data concerning the parking space can be used to inform the driver for example as to whether the parking space is large enough to park a vehicle, or also to assist in the calculation of actions of a parking assistance system.

A plurality of line scan cameras can also be provided for the acquisition of different regions, in order to increase precision, in order to avoid shadowing, or in order to acquire different types of parking spaces. Thus, for example one line scan camera can be situated on the right side of the vehicle in order to measure parking spaces on the right side of the street, and another camera can be situated on the left side of the vehicle in order to measure parking spaces on the left side of the street. Likewise, a camera can be situated in the front region of the vehicle and another camera can be situated in the rear region, in order to be able in each case to determine the data concerning the parking space at the earliest possible time independent of the direction of travel; in the case of forward travel, one of the line scan cameras is in operation, and in the case of reverse travel the other camera operates. It is also possible for both line scan cameras to be used simultaneously in order to achieve optimal covering of the parking space under all conditions, or also a redundant measurement. It is also possible for the multiplicity of line scan cameras to be fashioned or situated differently, for example having directions of view with different oblique positions relative to the longitudinal direction, in order to reduce shadowing.

Advantageously, the depth-resolving line scan camera can be a PMD (photon mixing device) sensor, or range imager. Such a sensor can be obtained at low cost. The active illumination allows its use even under poor lighting conditions, such as at night. It is particularly preferable if the sensor operates in the NIR range, because this is invisible to the human eye, but the sensor and receiver technology is mature and robust and easily available.

In another advantageous development of the present invention, the illumination, resolution, and angular range of the depth-measuring line scan camera can be realized by a suitable optical system, for example through toroid lenses having different focal lengths in different planes. Such measures can be provided both for the configuration of the radiation range of the transmitter and of the sensitivity range of the receiver. In this way, for each pixel the desired radiation or sensitivity profile, for example including oval profiles, can be achieved. Thus, in particular it can be advantageous to have beam profiles having different widths in the horizontal and in the vertical direction, optimally adapted to the respectively required resolution in the horizontal and in the vertical direction.

For the precise height measurement of obstacles, in particular curbs, it can be particularly advantageous if the resolution of the depth-measuring line scan camera is different horizontally and vertically, or is adapted to the respectively required degree of precision as a function of the direction of view. Thus, for example the detection range of each pixel in the vertical direction can be less than in the horizontal direction. In this way, at a given sensitivity level of the pixels, a particularly high resolution and measurement precision in the vertical direction can be achieved in order for example to determine the height of a curb as precisely as possible, in order to classify it according to whether a part of the vehicle body can pass over it or not. Likewise, the resolution of the line scan camera in a direction of view in which objects whose height has to be precisely measured are located in frequently recurring driving situations can be greater than in other regions. This can be achieved for example through a different pixel spacing or through the use of a multiplicity of sensors or line scan cameras having different resolution. Given suitable design and situation, in this way for example objects in the vicinity of the roadway surface, in particular curbs, can be measured very precisely, while for the upper region of vehicles, about which less precise knowledge is required for a parking process, a lower outlay in terms of sensor equipment and evaluation is sufficient.

In order to acquire the movement of the vehicle, systems can be used that are connected to the vehicle or that are independent of the vehicle. In a preferred specific embodiment, odometry sensors are used for this purpose. This has the advantage of a simple, low-cost realization. In addition, such sensors are frequently already present in vehicles as parts of other systems, for example ABS or ASR; the use of these sensors has the particular advantage that no additional costs for sensor equipment are incurred.

The acquisition of the movement of the vehicle enables in particular the determination of the path increment by which the vehicle has further moved from one photograph of the line scan camera to the next, and thus, with the assistance if warranted of additional data concerning the orientation of the line scan camera or rotational movements of the vehicle, the assembly of successive photographs in order to create a complete image of the environment surrounding the vehicle.

In a method according to the present invention for measuring a parking space as a vehicle travels by the parking space, i.e. a region in the environment of the vehicle that can potentially be used as a parking space, a sequence of individual images are recorded of the environment surrounding the vehicle (1) in a horizontal direction transverse to a longitudinal direction (x) of the vehicle, the individual images being resolved in an additional direction transverse to the longitudinal direction (x) of the vehicle, the movement of the vehicle while traveling past the parking space is acquired, and from this the path increment from one individual image photograph to the next is calculated; here, movements other than the movement of the vehicle in the longitudinal direction can also be acquired for later evaluation. According to the present invention, a depth-measuring line scan camera is used to take the individual images, so that the individual images in the additional direction contain one-dimensionally resolved brightness and depth information. From the sequence of one-dimensional individual images with depth information, the boundaries of the parking space can be recognized with a high degree of precision, and the usable dimensions of the parking space can be determined.

One example implementation of the method according to the present invention provides the further advantage that a reliable evaluation of the data supplied by the line scan camera is possible with a low computing and storage capacity, and therefore quickly and at low cost. Here, for example given a parking space open at the front, the beginning and the depth of the parking space can be determined.

One example implementation of the method according to the present invention enables, also in a simple and economical manner, the determination of the position and the length of a parking space that is bounded at the front and at the rear.

DETAILED DESCRIPTION OF THE INVENTION

Figure 1:
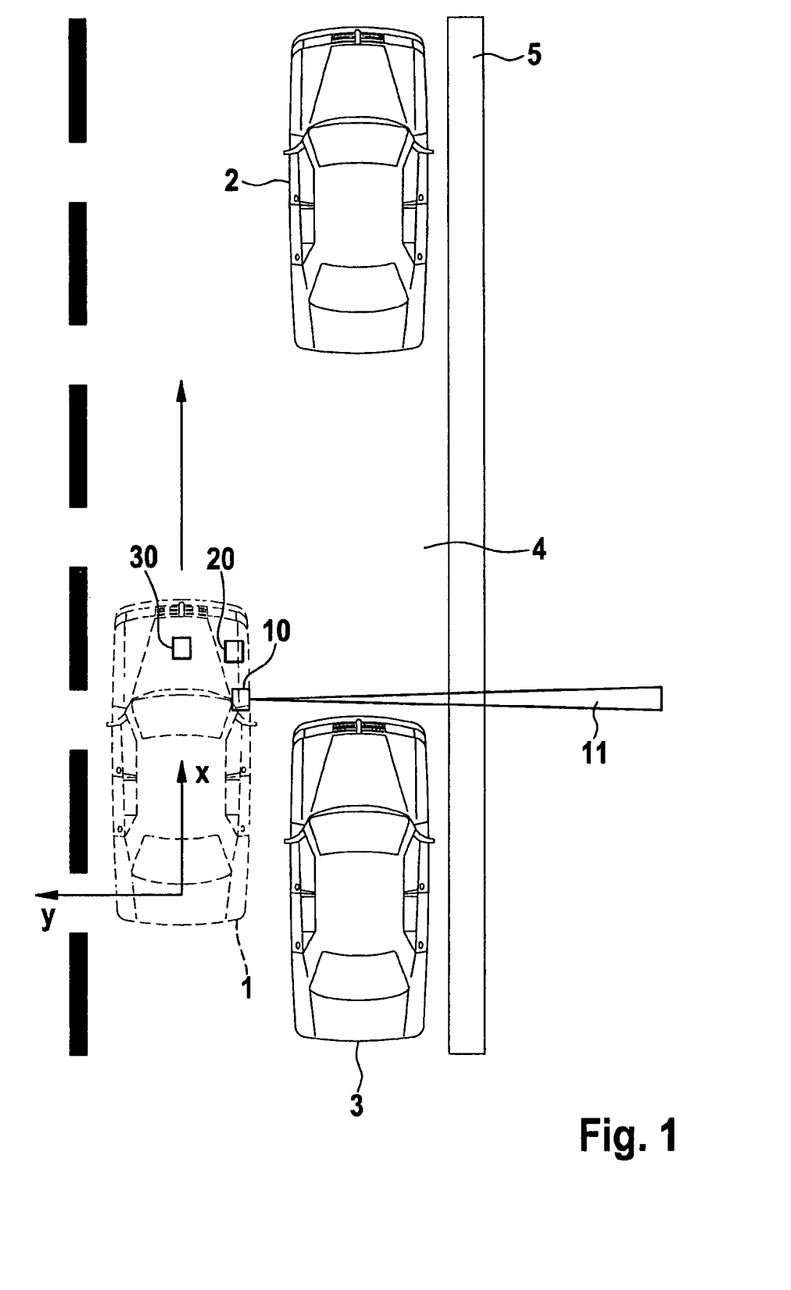
FIG. 1 shows a situation in which a vehicle is driving by a parking space, from a bird's-eye view.

A situation in which the device according to the present invention and the method according to the present invention can advantageously be used is shown in FIG. 1 in a top view (from a bird's-eye view). A vehicle 1 that is equipped with the device according to the present invention drives past objects, for example standing vehicles 2 and 3, which bound an intermediate space that is potentially suitable as a parking space 4. Parking space 4 is also bounded by a curb 5. Of course, the parking space may also be bounded by other objects, such as trees, posts, parked bicycles, etc. However, the use of the device according to the present invention can also be advantageous if the parking space is open at more than one side, if for example no curb is present, or if only a single standing vehicle 3 is present. The device according to the present invention produces data that are used by a higher-order driver information or control system as a basis for information given to the driver, or if warranted for further actions such as the planning and execution of a partly or completely automatic parking process.

Figure 2:
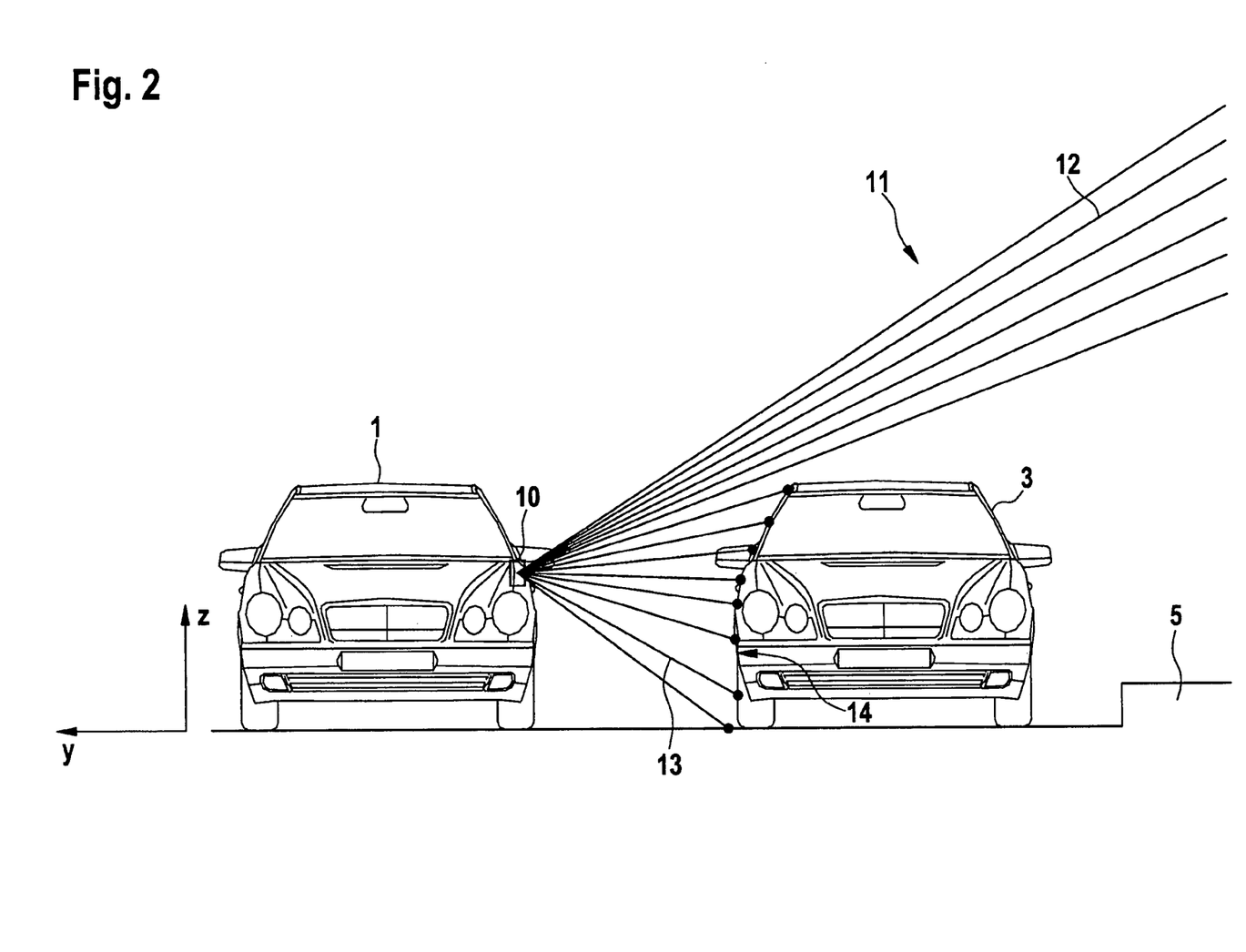
FIG. 2 shows the functioning of the device according to the present invention in a cross-sectional view of the scene in FIG. 1.
Figure 3:
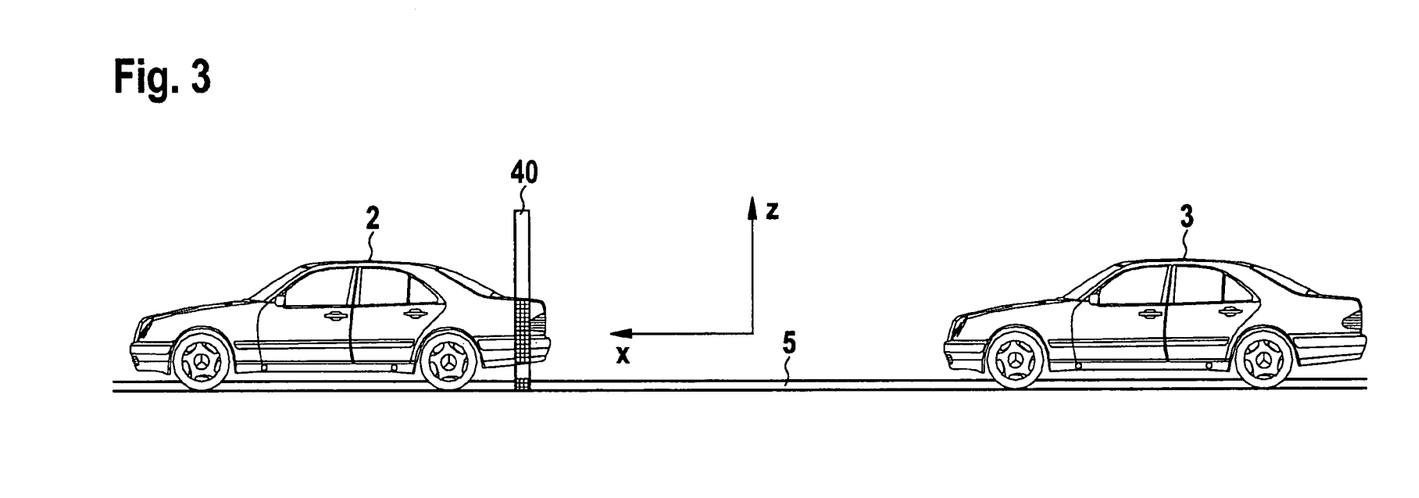
FIG. 3 shows a side view of the scene in FIG. 1, with a schematically shown individual image of a line scan camera.

For this purpose, according to the exemplary embodiment a depth-measuring line scan camera 10 is provided whose direction of view is oriented perpendicular to longitudinal direction x of the vehicle. As is shown in FIG. 2, the receiving aperture of depth-measuring line scan camera 10 spans, in the vertical direction, a fan-shaped region 11 that acquires objects situated in the environment surrounding vehicle 1. A visual beam 12, 13 in a particular spatial direction is allocated to each pixel of the line scan camera. For those pixels whose visual beams 12 do not meet an object, there is no depth information and possibly also no brightness information. For those pixels whose visual beams 13 meet an object, the depth-measuring line scan camera determines, in addition to the brightness value, an item of depth information, i.e. the distance to the object's surface 14. Because the angle of each visual beam 12, 13 to the horizontal is known, in this way an image including distance information can be obtained from each individual image of the depth-measuring line scan camera. In FIG. 3, in a side view of the scene from FIG. 1 the inverse brightness distribution is shown as an example in an individual image 40 of the line scan camera.

Figure 4:
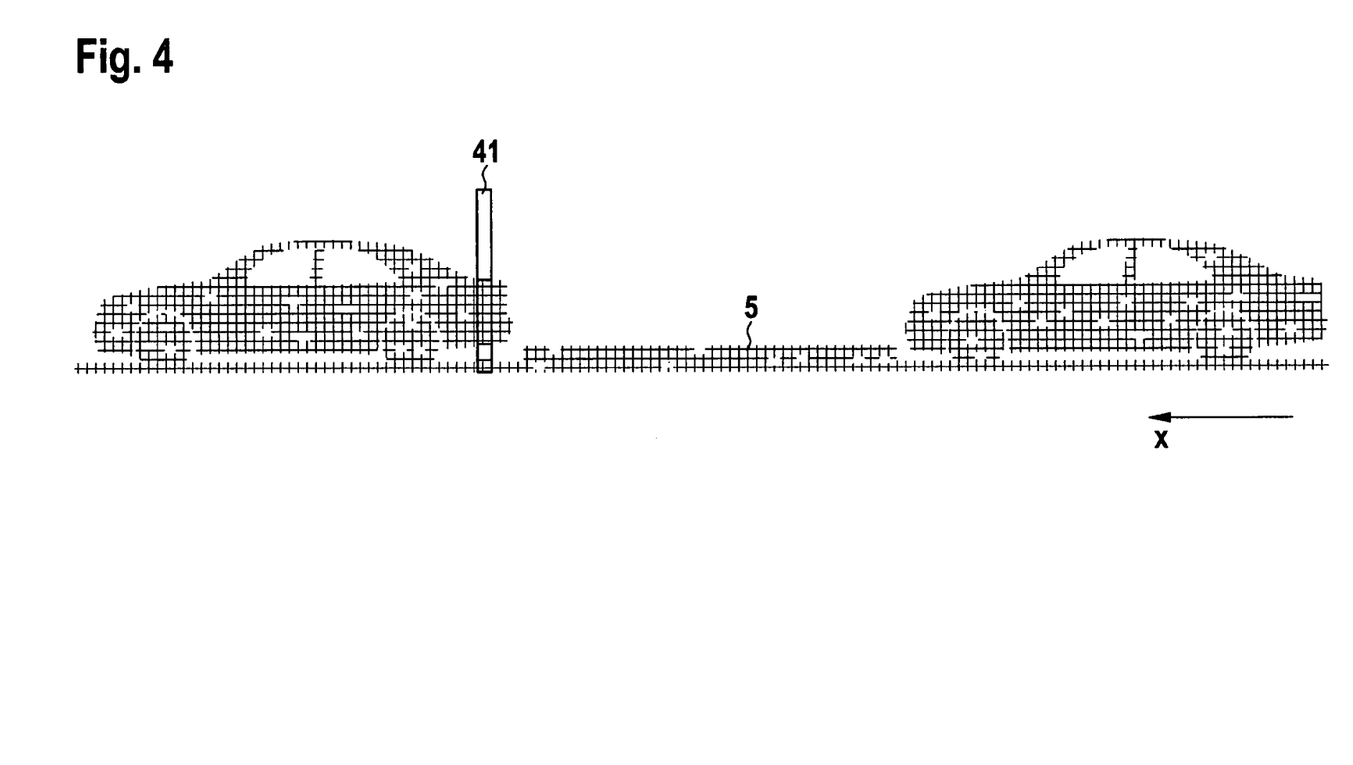
FIG. 4 shows a synthesized image of the line scan camera while driving by the parking space of FIG. 1.

If vehicle 1 with line scan camera 10 situated thereon moves in longitudinal direction x past stationary vehicles 2, 3, a complete image of the scene can be synthesized from the successive individual images of the line scan camera (FIG. 4). Here, a column 41 of the synthesized image corresponds to an individual image of the line scan camera. The width of each column corresponds to the path increment that vehicle 1 has traveled from one photograph of the line scan camera to the next. In order to determine this path increment, a second sensor, for example an odometry sensor 20, is provided that determines the speed of the vehicle from the wheel movement, from which, together with the temporal spacing of the individual photographs of the camera, the path increment can be calculated. Here, the temporal spacing of the individual photographs can for example be a function of the speed of vehicle 1 and the desired resolution in the x direction.

Figure 5:
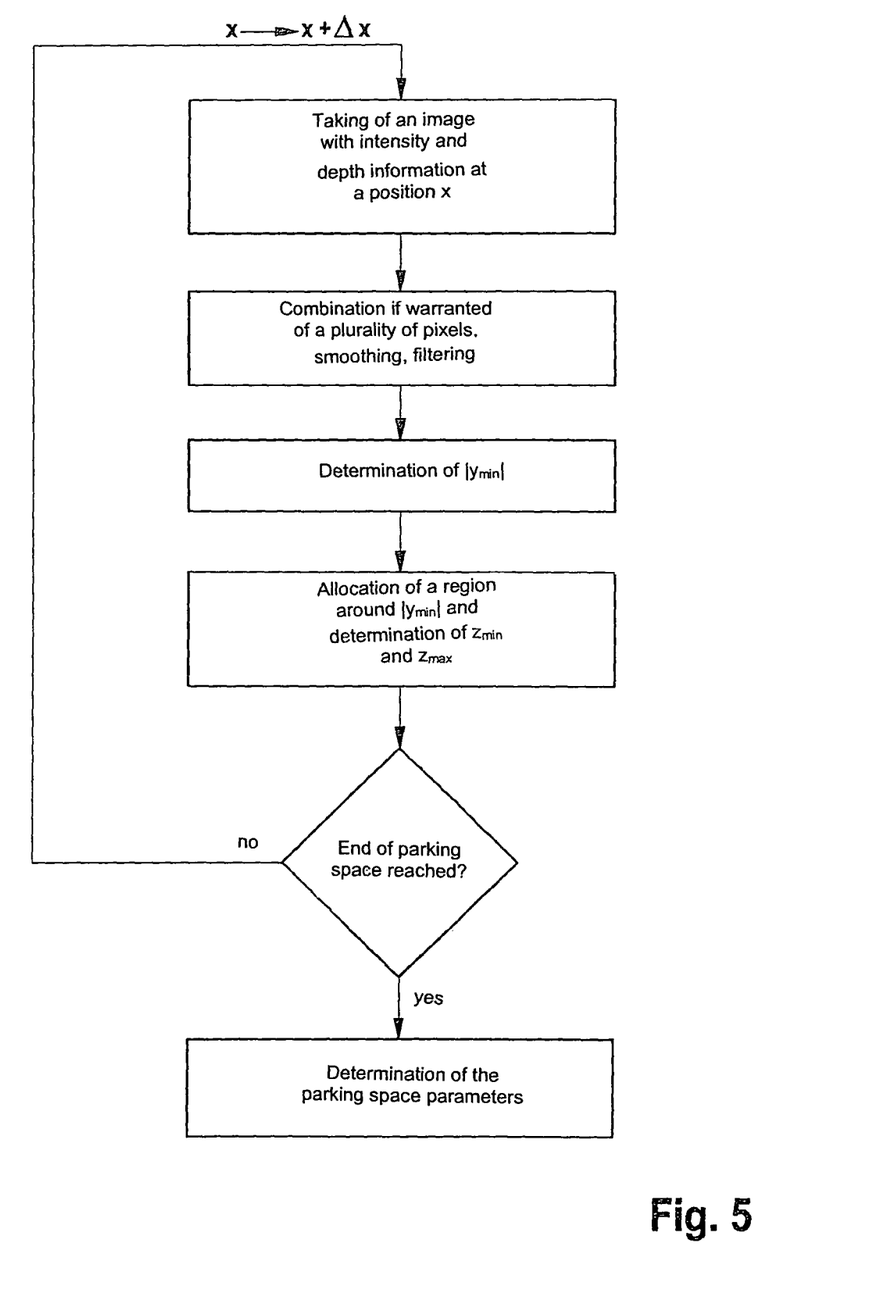
FIG. 5 shows, in schematic form, a method according to the present invention for determining the parameters of a parking space.
Figure 6:
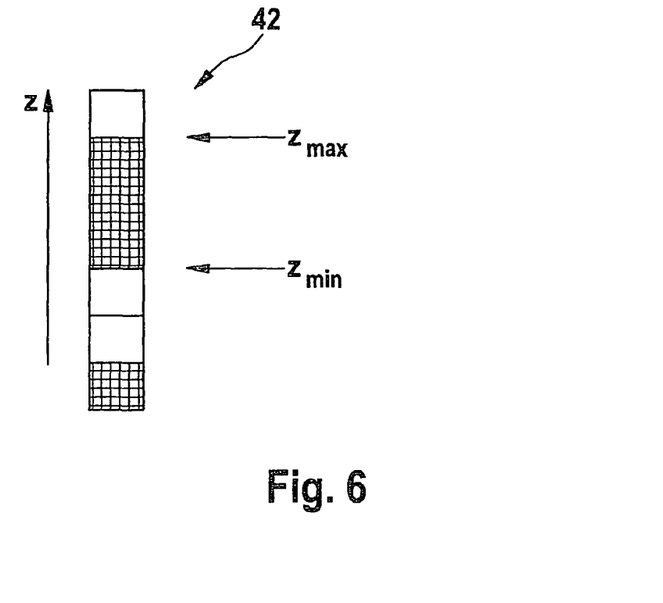
FIG. 6 shows the part of the individual image from FIG. 3 that is essential for the execution of the method according to the present invention.

A method according to the present invention is shown schematically in FIG. 5. As vehicle (1) travels past the parking space, the depth-resolving line scan camera takes a large number of individual photographs, as a result of which, in addition to brightness information depth information is also present for each pixel, from which distance information is determined. In the course of a filtering, the data can be smoothed, or a plurality of pixels having similar depth or distance information can be combined, and errored values, unusable for example due to sensor defects, reflexes, or the like, can be eliminated. In the next step, at least one distance minimum $|y_{min}|$ is determined in each case, and the region contiguous therewith according to the distance information is determined, representing in each case objects in the environment. This is shown schematically in FIG. 6 for a column 42 of the synthesized image of the environment surrounding the vehicle. For these regions, the minimum and the maximum vertical value $z_{min}$ and $z_{max}$ are then determined that characterize the dimensions of the relevant object; here, if warranted the measurement values representing the street surface are eliminated. In particular, $z_{max}$ is important for determining whether it is possible to drive over objects and for classifying objects into those that can be driven over, such as a lowered curb, those that can be driven over for example with the rear of the vehicle but not with a wheel, such as a curb below a predetermined maximum height, and those that cannot be driven over, such as a parked vehicle, a post, or a wall. These steps are repeated for a large number of successive positions x, modified in each case by a path increment (for example Δx).

Figure 7:
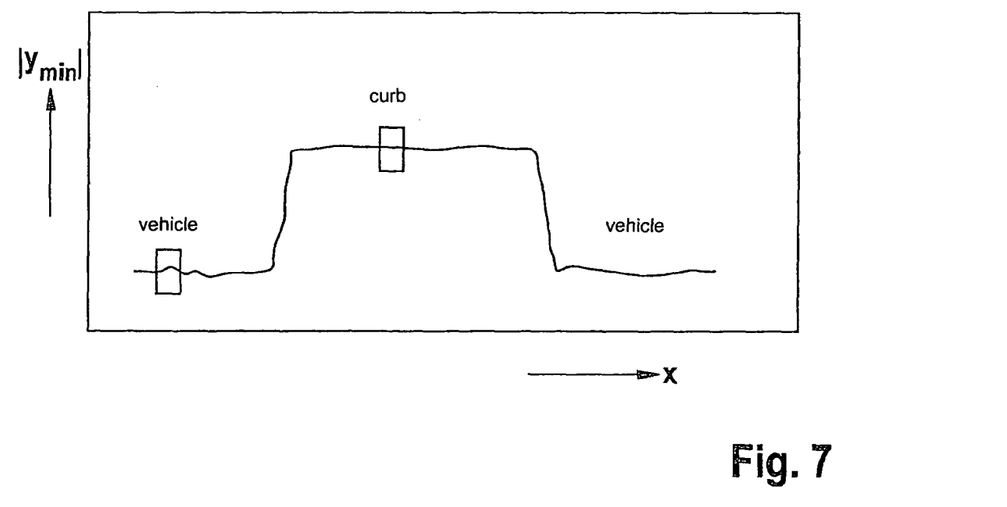
FIG. 7 shows, in schematic form, the depth information contained in the image in FIG. 4.

For each position x, i.e. for each individual image or for a large number of contiguous individual images, in this way essential characteristic quantities, such as the distance to an object or the height of the object, can be determined. In this way, a decision can be made as to whether at the relevant position x in the longitudinal movement of the vehicle usable space is present for a possible parking space or not. If, as the vehicle continues to drive by, an existing space ends, which is recognized for example (as shown schematically in FIG. 7) by a jump in $|y_{min}|$, then from the available data a decision is made as to whether the space can be used as a parking space or not, and the corresponding data are for example made accessible to a driver information system or parking assistance system.

In order to carry out the method, line scan camera 10 and odometry sensor 20 are connected to an evaluation device 30 that determines the named items of information from the data supplied by the sensors, and if warranted makes this information available to a higher-order system.

What is claimed is:

1. A device for measuring a parking space as a vehicle drives by the parking space, comprising:
    at least one sensor located on the vehicle and movable with the vehicle for acquiring data concerning the environment surrounding the vehicle in a horizontal direction transverse to a longitudinal direction of the vehicle, wherein the at least one sensor is a depth-measuring line scan camera, wherein the acquired data concerning the environment surrounding the vehicle are configured to be one-dimensionally resolved in an additional direction transverse to a longitudinal direction of the vehicle, and wherein the data concerning the environment surrounding the vehicle contain brightness information and depth information resolvable in the additional direction;
    an arrangement configured to acquire data regarding movement of the vehicle as the vehicle drives past the parking space; and
    at least one evaluation device configured to evaluate the data.

2. The device as recited in claim 1, wherein multiple depth-measuring line scan cameras are provided.

3. The device as recited in claim 1, wherein the depth-measuring line scan camera is configured to operate as one of a PMD sensor or a range imager.

4. The device as recited in claim 3, wherein the resolution of the line scan camera is higher in the vertical direction than in the horizontal direction.

5. The device as recited in claim 3, wherein the resolution of the line scan camera is a function of a direction of view.

6. The device as recited in claim 3, wherein odometry sensors are provided as the arrangement configured to acquire data regarding the movement of the vehicle.

7. A method for measuring a parking space as a vehicle drives past the parking space, comprising:
    using a depth-measuring line scan camera, taking a sequence of individual images of a surrounding environment of the vehicle in a horizontal direction transverse to a longitudinal direction of the vehicle as the vehicle drives past the parking space, the individual images being resolved in an additional direction transverse to the longitudinal direction of the vehicle, wherein the individual images in the additional direction contain one-dimensionally resolved brightness and depth information;
    acquiring data regarding movement of the vehicle as the vehicle drives past the parking space;
    calculating a path increment from one individual photograph to a successive individual photograph; and
    determining, from the sequence of individual images with one-dimensionally resolved depth information, the boundaries of the parking space and the usable dimensions of the parking space.

8. The method as recited in claim 7, wherein:
from the one-dimensionally resolved depth information for at least one individual image, at least one local minimum of a distance from the vehicle is determined,
for the at least one local minimum, a region contiguous with the at least one local minimum is determined within the at least one individual image,
for the region contiguous with the local minimum, minimum and maximum vertical values are determined,
based on the minimum and the maximum vertical values, an object bounding the parking space is recognized and is classified as one of (i) capable of being driven over, (ii) capable of being passed over by a part of the vehicle body, or (iii) not being capable of driven over or passed over, and
based on the at least one local minimum and the classification of the object bounding the parking space, the beginning and the depth of the parking space are determined.

9. The method as recited in claim 8, wherein the end and the length of the parking space are determined as the vehicle drives past the parking space, and data regarding the end and the length of the parking space are communicated to one of a driver information system or parking assistance system.

* * * * *

UNITED STATES PATENT AND TRADEMARK OFFICE
CERTIFICATE OF CORRECTION

PATENT NO. : 8,422,737 B2  Page 1 of 1
APPLICATION NO. : 12/735341
DATED : April 16, 2013
INVENTOR(S) : Scherl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this
Eighth Day of September, 2015

Michelle K. Lee
*Director of the United States Patent and Trademark Office*